C. GOLDTHWAIT.
KNOBS FOR VESSEL-LIDS.

No. 178,626. Patented June 13, 1876.

WITNESSES:
H. Rydquist.
John Goethals

INVENTOR:
C. Goldthwait
BY
ATTORNEYS.

UNITED STATES PATENT OFFICE.

CHARLES GOLDTHWAIT, OF SOUTH WEYMOUTH, MASSACHUSETTS.

IMPROVEMENT IN KNOBS FOR VESSEL-LIDS.

Specification forming part of Letters Patent No. 178,626, dated June 13, 1876; application filed May 1, 1876.

*To all whom it may concern:*

Figure 1:
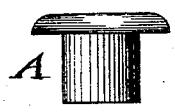
Figure 2:
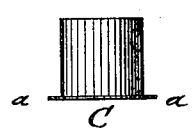
Figure 3:
Figure 4:
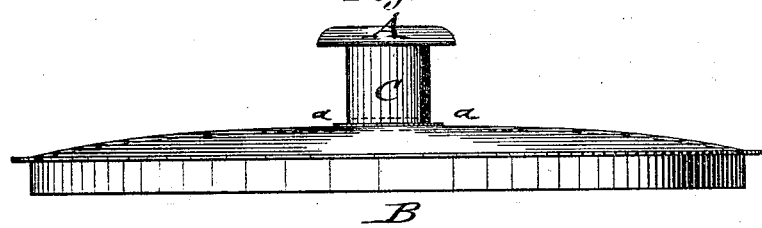
Figure 5:
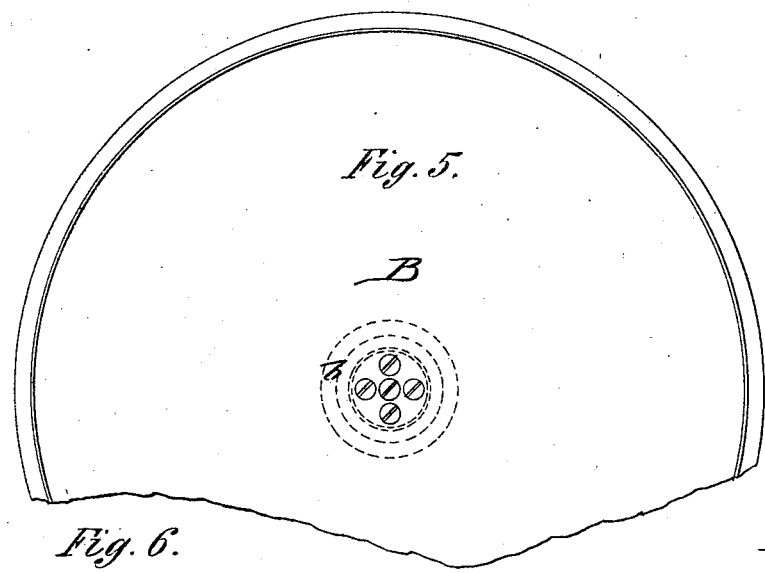
Figure 6:
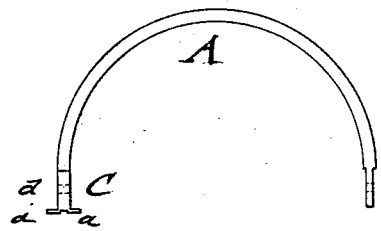
Figure 7:
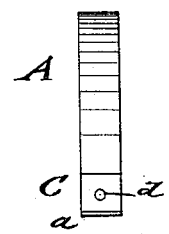

Be it known that I, CHARLES GOLDTHWAIT, of South Weymouth, in the county of Norfolk and State of Massachusetts, have invented a new and Improved Knob for Lids of Vessels, of which the following is a specification:

In the accompanying drawing, Figures 1, 2, and 3 are side and bottom views of the detached parts of my improved knob for lids or covers of vessels, Fig. 4 is a side view, and Fig. 5 a bottom view, of the knob as attached to a cover; and Figs. 6 and 7 are side and end views of a differently-shaped knob or handle.

Similar letters of reference indicate corresponding parts.

My invention relates to an improved knob for lids or covers of coffee and tea pots, boilers, kettles, and other vessels, which is constructed in a cheap and simple manner, to insulate the heat, and admit the ready handling of the cover without burning the fingers.

The invention will first be described in connection with the drawing, and then pointed out in claims.

In the drawing, A represents the knob or handle of the lid or cover B of any vessel, being made of hard wood, ivory, or other suitable non-conductor of heat, according to the style of vessel to which the knob is attached. The knob is applied to the lid or cover B by a shank-encircling tube, C, of suitable sheet metal, that is soldered by an exterior base flange, a, to the lid, or placed loosely thereon. The shank of the knob is made somewhat shorter than the tube C, to produce a small insulating air-space between the lid and knob.

To large and heavy covers the knob A is, preferably, applied by one or more fastening-screws, b, that pass through the lid into the bottom of the knob, as shown in Fig. 5, while to lighter lids, as in coffee and tea pots, a rivet or cross-pin, d, that fastens the knob to the tube, is sufficient.

The wooden knob admits the handling of the lid without difficulty during cooking, or when the lid is hot, the knob requiring to be taken hold of above the shank-holding tube.

The knob may be made of any desired shape, as shown in Figs. 1 and 6, and forms a convenient, cheap, and simple means of insulating the heat, so that even the softest fingers may handle the lid of hot pots, kettles, wash-boilers, and other vessels with great facility, and without getting hurt.

Having thus described my invention, what I claim as new, and desire to secure by Letters Patent, is—

1. The combination, with cover B, of the encircling-tube C and the knob A, having shank shorter than said tube, as and for the purpose specified.

2. The tube, in combination with knob and cover, provided with the flange a, as and for the purpose set forth.

CHARLES GOLDTHWAIT.

Witnesses:
GEORGE W. LLOYD,
CHARLES S. LLOYD.